Oct. 20, 1931.　　F. A. KOLSTER ET AL　　1,828,706
OSCILLATION GENERATOR AND METHOD
Filed Oct. 30, 1928

INVENTORS:
Frederick A. Kolster
BY　Geoffrey G. Kruesi
　White, Prost Fryer
　　　　ATTORNEYS.

Patented Oct. 20, 1931

1,828,706

UNITED STATES PATENT OFFICE

FREDERICK A. KOLSTER AND GEOFFREY GOTTLIEB KRUESI, OF PALO ALTO, CALIFORNIA, ASSIGNORS TO FEDERAL TELEGRAPH COMPANY, OF SAN FRANCISCO, CALIFORNIA, A CORPORATION OF CALIFORNIA

OSCILLATION GENERATOR AND METHOD

Application filed October 30, 1928. Serial No. 316,037.

This invention relates to vacuum tube oscillator circuits and more particularly to such circuits for generating high frequency radio waves.

A general object of the invention is to provide an oscillation generator capable of operation at extremely high radio frequencies, and which will oscillate at a relatively constant frequency.

In the usual form of oscillation generator an audion or other form of electron relay has its elements connected to one or more tuned oscillatory circuits. Oscillations are generated by virtue of a feed back of energy between the output and input circuits of the relay, which if not produced conductively, inductively or capacitatively by external circuits, is effected by the capacitance existing between certain electrodes of the relay. When operating upon relatively short wave lengths, say below 600 meters, it has been found that the frequency of the oscillations produced tends to be unstable. Such frequency variations may be due to a number of factors which tend to vary normal functioning of the relay or the constants of the circuits, as for example a slight change in the plate potential or a change in the interelectrode capacitance of the relay. We have discovered that with a proper arrangement of electrical circuits connected to an electron relay, the plate-cathode capacitance of the relay can be employed as the principal reactive path for feeding energy from the output to the input of the relay. We have also found that when a relay is operated in this manner, the frequency of the oscillations produced is more stable and the relay can be operated at good efficiency with zero grid bias.

This application is in part a continuation of our application Ser. No. 309,601, filed October 1, 1928.

Figure 1:
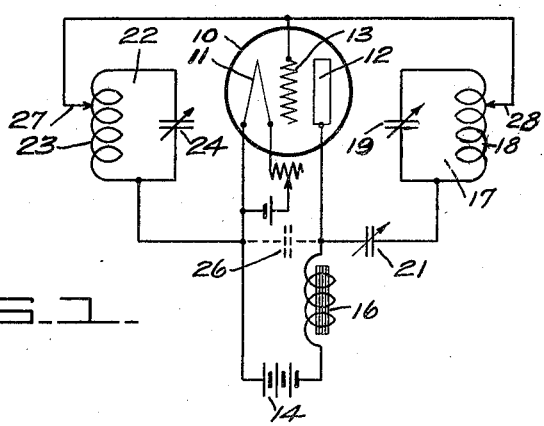
Fig. 1 is a circuit diagram showing the basic circuit of our oscillation generator.

Referring to Fig. 1 for one embodiment of our invention, we have shown an electron relay 10 having the usual cathode 11, plate or anode 12, and grid or control electrode 13. The plate circuit is energized from a suitable source of current represented by "B" battery 14, the positive terminal of this battery being connected to the plate through a suitable high frequency choke 16. The plate and grid of the relay are connected to two points of different potential of a closed reactive circuit 17, which may consist for example of an inductance 18, shunted by a capacitance 19. A blocking condenser 21 is preferably inserted in series with the connection to the grid 13.

In addition to circuit 17 I provide a closed reactive circuit 22, consisting for example of inductance 23 shunted by capacitance 24. Points of different potential in the tuned circuit 22 are connected to the grid 13 and the cathode 11 of the relay as shown.

Circuits 17 and 22 are so adjusted that one circuit is reactive negatively and the other reactive positively with respect to the desired frequency of operation. Preferably the grid-cathode circuit 22 is made negatively reactive and the grid-anode circuit positively reactive, and these circuits in conjunction with the intercoupling anode-cathode capacitance indicated at 26, cause the network as a whole to be resonant at the desired operating frequency. In one instance good results were obtained by individually tuning the grid cathode circuit 22 to 16,200 kilocycles and the grid-anode circuit 17 to 18,500 kilocycles in order to obtain a frequency of operation of 17,900 kilocycles. Similarly, operation was secured on 8430 kilocycles by tuning circuit 22 to 6850 kilocycles and circuit 17 to 8600 kilocycles.

Oscillations are generated as the result of feed back of energy from the output circuit to the input circuit of the relay. In former conventional circuit arrangements for electron relays positive feed back of energy generally occurs in part or entirely by virtue of the capacitance afforded by the proximity of the grid and plate within the evacuated envelope of the electron relay. With the arrangement described above however, presuming that substantially no external direct coupling is afforded between circuits 17 and 22, feed back of energy from the output circuit to the input circuit of the relay occurs through the plate-cathode capacitance 26. In most electron relays of modern construction, the plate-cathode capacitance is considerably less than the grid-plate capacitance, due chiefly to the fact that the grid is positioned between the cathode and the plate. Therefore, changes in the physical operating conditions of the relay, as for example, a change in the temperature of the electrodes, causes a considerably less percentage change in the plate-cathode capacitance than in the grid-plate or the grid-cathode capacitance. Furthermore, a change in the potential of the plate exciting circuit will not cause an appreciable change in the plate-cathode capacitance and will not produce a serious change in the reaction between the input and output circuits. Due to these factors and possibly also due to other effects which we have not discovered, the oscillation generator of our invention will generate oscillations of practically constant frequency at extremely low wave lengths, say in the neighborhood of from 3 to 20 meters.

We have found that in making connections between tuned circuit 22 and the relay, it is preferable to provide a coupling adjustment, and for this purpose we have shown a tap 27 on inductance 23 for connection to grid 13. By adjustment of tap 27 to a certain intermediate position on inductance 23, which can be readily determined by experiment for any one relay arrangement, the generator can be made to operate at optimum efficiency. Variation of this tap serves to properly control the potentials upon the relay grid and in addition serves as means for adjusting the relative magnitudes and phase relations of currents in the circuits. To afford further means for adjustment, a tap 28 can be provided upon the inductance 18.

It is also characteristic of our invention that the electron relay can be operated with good efficiency at practically zero grid bias. Thus as shown in Fig. 1 a direct conductive connection of comparatively low resistance is provided between the grid and the cathode of the relay. In the past it has been found difficult to properly operate an electron relay with zero grid bias, due to overheating of the grid and plate. With our circuit arrangement the feed back is of proper amount and is of such a controlled character that the relay is not operated beyond saturation on relatively short wave lengths, and therefore the grid currents are not so excessive as to cause overheating.

With the apparatus as described above, tuning of the grid-anode circuit 17 is effected by varying condenser 19. In practice condenser 19 can be reduced to zero and the circuit tuned by varying condenser 21. In this case circuit 17 is completed thru the grid-anode capacitance of the relay.

Figure 2:
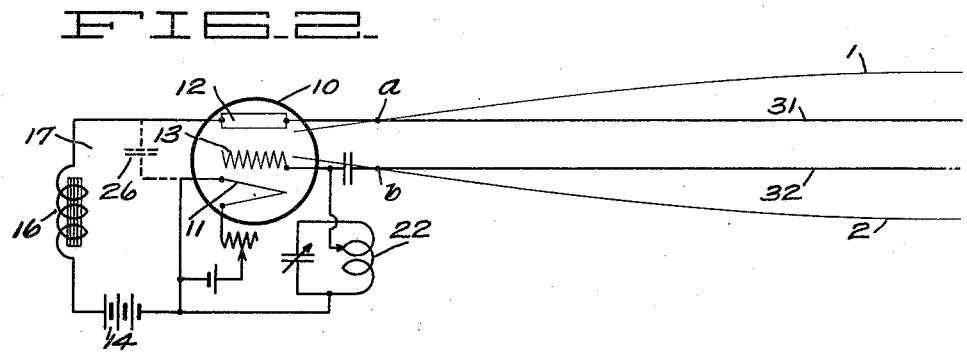
Figs. 2 and 3 are circuit diagrams illustrating modifications of the circuit shown in Fig. 1 in which the oscillation generator is associated directly with a radiating system.

In Fig. 2 we have shown a modification of our oscillation generator in which the oscillation circuit connected between the grid and plate of the relay utilizes the distributed inductance and capacitance of one or more extended conductors in spaced parallel relationship and having corresponding ends connected to the grid and plate of the relay 10. The distributed capacitance and inductance of conductors 31 and 32, supplemented in part by the grid-plate capacitance of the relay, forms one oscillatory circuit similar to circuit 17 of Fig. 1, while the other tuned circuit 22 is connected between the grid 13 and the cathode 11. Preferably conductors 31 and 32 are slightly longer than one-quarter wave length of the oscillations being generated, so that the effect of standing waves is produced. Curves 1 and 2 represent the potential distribution for conductors 31 and 32, and it is to be noted that nodal points $a$ and $b$ fall relatively close to the electrodes of relay 10. With such potential distribution, relatively high potentials are built up upon the outer ends of conductors 31 and 32, but the electrodes of the relay are subject to relatively low potentials.

Figure 3:
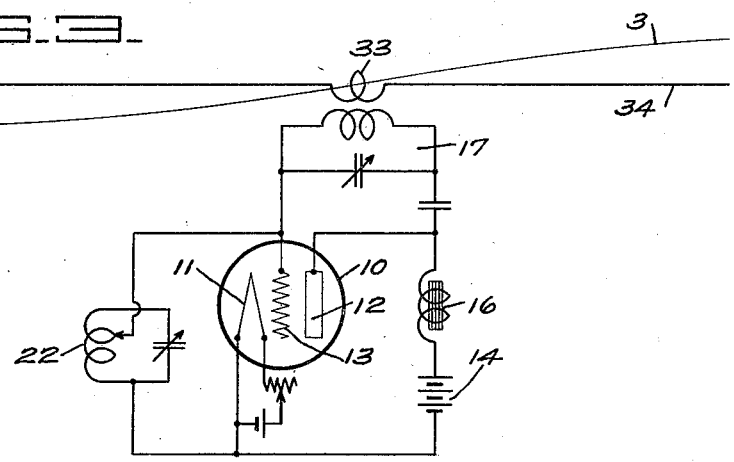

Another arrangement for producing the effect of standing waves upon conductors is shown in Fig. 3. The oscillation generator of this figure is similar to that of Fig. 1, except that an inductive element 33 of an extended conductor 34 is coupled to the tuned circuit 17. Conductor 34 preferably has an effective length equal to one-half wave length of the oscillatory energy generated, and the potential distribution which can be secured is indicated by curve 3. The potential nodal point falls within the inductive element 33.

We claim:

1. An oscillation generator comprising an electron relay having grid, anode, and cathode electrodes, a closed reactive circuit having points of different potential thereof connected to the grid and anode of the relay, and another closed reactive circuit having points of different potential connected to the grid and cathode.

2. An oscillation generator comprising an electron relay having grid, anode and cathode electrodes, a closed reactive circuit having points of different potential thereof connected to the grid and anode of the relay, and another closed reactive circuit having points of different potential connected to the grid and cathode, said last named circuit forming a low resistance path for direct current between said grid and said cathode.

3. An oscillation generator comprising an electron relay having grid, anode and cathode electrodes, a closed reactive circuit having points of different potential thereof connected to the grid and anode, an anode-cathode circuit including a source of current for energizing said anode, and another closed reactive circuit connected to the grid and cathode, said circuits being so related and adjusted that positive feed back of energy between the circuits is provided by the plate cathode capacitance of the relay.

4. An oscillation generator comprising an electron relay having grid, anode and cathode electrodes, a closed reactive circuit having points of different potential thereof connected to the grid and anode, an anode-cathode circuit including a source of current for energizing said anode, and another closed reactive circuit connected to the grid and cathode, said circuits being so related and adjusted that positive feed back of energy between the circuits is provided by the plate cathode capacitance of the relay, said other circuit forming a connection of low resistance for direct current between said grid and cathode.

5. An oscillation generator comprising an electron relay having grid, anode and cathode elements, a reactive circuit having inductive and capacitative elements in shunt connected across the grid and cathode, another reactive circuit having inductive and capacitative elements in shunt connected across the grid and anode, said circuits being adjusted to be oppositely reactive whereby when in conjunction with intercoupling anode-cathode capacitance of the relay a condition of resonance is formed, said circuits having sufficient intercoupling to effect generation of oscillations of a frequency determined by said condition of resonance.

6. An oscillation generator comprising an electron relay having grid, anode and cathode elements, a reactive circuit having inductive and capacitative elements in shunt connected across the grid and anode, another reactive circuit having inductive and capacitative elements in shunt connected across the grid and cathode, said circuits being adjusted to be oppositely reactive whereby when in conjunction with intercoupling anode-cathode capacitance of the relay a condition of resonance is formed, said circuits having sufficient intercoupling to effect generation of oscillations of a frequency determined by said condition of resonance, said grid cathode circuit forming a path of low resistance for direct current between said grid and cathode.

7. An oscillation generator comprising a vacuum tube having a cathode, an anode, and a control electrode, a closed oscillatory circuit tuned slightly above the frequency of oscillation, and having two points at different potential thereon connected to the grid and to the anode, respectively, a second circuit inserted between the cathode and grid, comprising inductance and capacity in parallel and having substantial capacitive reactance at the oscillation frequency, said oscillation generator depending upon the inherent capacity between cathode and anode for the feedback necessary to produce oscillations.

8. An oscillator comprising a vacuum tube having a cathode, an anode, and a control electrode, a major frequency determining circuit comprising a capacitance and an inductance inserted between the grid and anode, said major frequency determining circuit being shunted by two capacitively reactive paths in series, one of said paths shunting the cathode and anode and constituted solely by the inherent cathode-anode capacity of the tube and the other shunting the cathode and grid and including an inductance and capacity in parallel.

In testimony whereof, we have hereunto set our hands.

FREDERICK A. KOLSTER.
GEOFFREY GOTTLIEB KRUESI.